… … … … … … … … … … … … … … … … … … … …

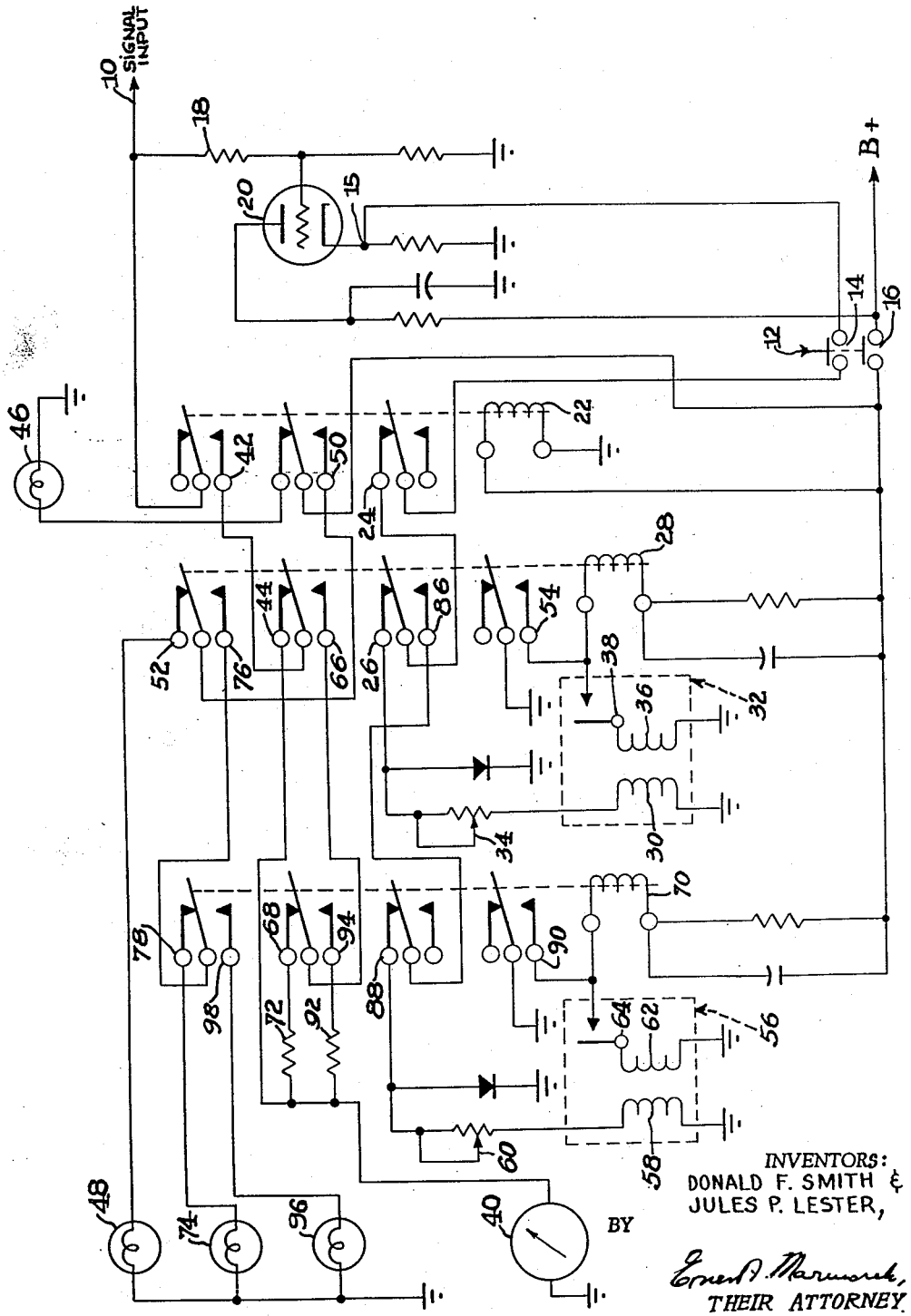

3,016,488
AUTOMATIC RANGE SELECTOR
Donald F. Smith, New York, and Jules P. Lester, Plainview, N.Y., assignors to Rodale Electronics, Inc., Westbury, N.Y., a corporation of New York
Filed Nov. 8, 1960, Ser. No. 68,038
6 Claims. (Cl. 324—115)

The invention relates to automatic range selectors, and relates more particularly to means and methods for the automatic sensing and automatic selection of the appropriate range of a meter, before the signal is applied to the meter.

In present metering devices it is necessary to select the meter range manually as a function of the value, such as the voltage or current of the incoming signal. This has the drawback that overload signals may still be introduced either inadvertently by the operator or may be caused by the various magnitudes of unknown signals. Such overload signal voltages or currents may be highly injurious to the meter or its parts or other devices hooked up electrically with the meter.

The instant automatic sensing and selection offers the advantage that the meter movements will be protected against the application of all overload signals.

It is accordingly among the principal objects of the invention to protect the meter from all overload signals.

It is a further object of the invention to provide an automatic range selector that applies the incoming signal to the meter only after having first automatically sensed and selected the proper meter range as a function of the value, such as the voltage or current, of the incoming signal.

It is another object of the invention to provide an automatic range selector that easily and automatically selects a meter range as a function of the signal level input.

It is still another object of the invention to provide an automatic range selector that can select any number of ranges that are incorporated in an electrical system.

An additional object of this invention is to provide a linearly setting meter movement sensor or similar device for the cascading of a series of signal levels and for selecting the proper measurement range automatically.

Another object of this invention is to provide a device which delays a signal before transmission thereof to a meter until the proper range has been sensed and selected, and which prevents measurement loading after the signal has been applied to the meter.

Still another object of this invention is to provide a device that can sense and automatically select ranges of extremely small signal levels with suitable repeatability.

A still further object of this invention is to provide an automatic device that can operate from any range of impedance source without degrading measurement.

Other objects, advantages and other features of the invention will appear as the description of the particular physical embodiment selected to illustrate the invention progresses. In the accompanying drawing, which forms a part of this specification, like characters of reference have been applied to corresponding parts.

The single view of the drawing is a wiring diagram of a range selector in accordance with the invention, showing a three-range circuit; it should be understood, however, that any number of ranges may be incorporated in the selector, and that the three ranges with their circuits have been shown only by way of illustration and without any intent to limit the scope of the invention.

The three ranges may, for instance, by way of exemplification include a first range of from zero to ten (0–10 mv.) millivolts, a second range of from ten to one-hundred (10–100 mv.) millivolts, and a third range of from one-hundred to one thousand (100–1,000 mv.) millivolts.

Let us assume, in a first example, that the signal input, which is supplied to the system at 10, has a level of four (4 mv.) millivolts.

The signal will at first be delayed, and a sensing current will for a period continue to flow alone through the electric circuit of the apparatus.

The sensing current is part of the signal and, as explained below, may have the full voltage of the signal or but a fraction thereof. In the example shown, however, the sensing current has a voltage which is only a fraction of the input signal voltage.

To read the signal, the meter read switch 12 must be depressed manually to close simultaneously two contacts 14 and 16. The signal current in the embodiment shown will then first travel through a resistor 18 to a cathode follower 20. The sensing current, having a voltage for instance of a calibrated fraction or portion of the signal voltage, will flow from a calibrating point 15 through a sensing circuit which includes the contact 14 and to a time delay means, such as a relay 22. The relay 22 is a time delay relay, and hence will not operate immediately, but only after the passage of a predetermined time, for instance one second.

The aforesaid current, which has as its voltage a sensing portion of the signal voltage, will continue to flow through the sensing circuit, which includes a contact 24 of the relay 22 and a contact 26 of a circuit locator means, such as a relay 28, to apply a voltage proportionately to the signal across the sensor coil 30 of a first detector means, such as a meter-relay 32.

The cathode follower 20, it will be observed, is used only where the signal source is a high impedance circuit; the voltage applied to the first detector 32 is the sensing voltage which in this instance is a fraction of the input voltage. The sensing voltage, however, may be that of the full signal of measurement when a low impedance signal source is used, as the meter-relay 32 is actually a meter movement type device.

To operate at a range of ten millivolts, the meter-relay 32 may be set, for instance, at five millivolts and a potentiometer 34 in series with the meter-relay 32 will be set for an additional voltage drop of five millivolts, where the sensing voltage is the full input signal voltage.

Where, as in the instant example, the sensing voltage is but a fraction of the input voltage, however, corresponding adjustments will need to be made in the parts of the apparatus, for instance the relay 32 and the potentiometer 34; these adjustments, for the sake of simplicity, however, have in the ensuing description been disregarded.

If the meter-relay 32, as stated for the purpose of the foregoing examples, is set with its potentiometer 34 at ten millivolts, then the sensing voltage would need to be ten millivolts or over before it could energize a locking coil 36 of the meter-relay 32 to actuate a contact 38 to send the signal through another portion of the circuit, as hereinafter described. Since the sensing voltage of this first example, however, is only four millivolts, and hence less than the ten millivolts to which the relay 32 has been set, the sensing current will stop at the sensor coil 30 without energizing the locking coil 36, and hence the relay 28 will remain unenergized and open.

The detector or relay 32 and the locator or relay 28 form a first sensing means and selector means of the apparatus.

The foregoing steps serve to sense the incoming signal and by means of the sensing current flowing in the sensing circuit to set the apparatus for subsequently applying the input voltage to the proper meter range.

Thereafter, as the switch 12 is kept depressed and after a sufficient time delay, for instance one second, for the cascading of the sensing current through the sensing circuit as hereinbefore described, the relay 22 will operate. The full input signal voltage of four millivolts will thereby be applied to the first (or ten millivolts) range of a measuring means or meter 40, by means of a set of meter circuit contacts, namely the contact 42 of the closed relay 22, and a contact 44 of the open relay 28.

In addition, the operation of the relay 22 will operate the range indicator 48, to give an audible or visible signal to indicate that the measurement is being made in the first (or ten millivolts) range.

The range indicator 48 forms part of an indicator circuit that is fed by the indicator current. The indicator circuit includes a first indicator 46 that will be energized only when, and as long as, the relay 22 remains non-actuated for the time delay period while the switch 12 is depressed. The indicator circuit will be operated by the indicator current which is derived from B+ or from the main supply voltage. The indicator current will flow through the indicator circuit which includes a contact 16 of the switch 12, a contact 50 of the closed relay 22 and a contact 52 of the open relay 28, to operate the indicator 48.

If the signal level is assumed in a second example to be fifteen millivolts (instead of the four millivolts of the preceding example) and the switch 12 is depressed, the sensing current, which may again be a calibrated fraction of the signal voltage, will travel from the point 15 through the previously described sensing circuit including the sensor contacts 24 and 26 and the sensor coil 30 of the meter-relay 32, as hereinbefore described. Since the sensing current is now assumed to be over ten millivolts, it will be of sufficient magnitude to operate the meter-relay 32 to close the contact 38 for the energization of the relay 28.

The operation of the contact 38 will thus cause the energization of the relay 28. This section will lock the relay 28 in the circuit owing to its holding contact 54; the delay relay 22, meanwhile, has still not been actuated in this second example.

To operate the second range of from ten millivolts to one-hundred millivolts, a second detector means, such as a meter-relay 56 through its sensor coil 58 may be set at fifty millivolts and a potentiometer 60 which is connected in series with the relay 56 may be set for an additional voltage drop of fifty millivolts. Therefore, a sensing voltage of one-hundred millivolts or over would need to be applied to the relay 56 and potentiometer 60 before the locking coil 62 of the relay 56 would be energized to actuate a contact 64 to send the sensing current through still another selector means, as hereinafter described. The signal of fifteen millivolts of this example, however, will of course not be sufficient to energize the relay 56.

The first detector 32 and second detector 56 and the locators 28 and 70 form a second sensing and selector means of the apparatus.

Therefore, when the relay 28 is energized through the meter-relay 32 and after the time delay needed to actuate the relay 22 has passed and the relay 22 has been actuated, the full voltage of the fifteen millivolts signal will be sent to the meter 40 by way of a set of meter circuit contacts, namely the contact 42 of the closed relay 22, a contact 66 of the closed relay 28, a contact 68 of a second circuit locator means, such as an open relay 70, and through a multiplier 72 to the second range, namely the ten to one-hundred millivolts range of the meter 40. In addition, the one-hundred millivolts range indicator 74 will be operated through the indicator current flowing in the indicator circuit that includes the indicator contacts 50, 76 and 78, showing that the measurement is being made in the second range.

A signal of over one-hundred millivolts will energize the third range in the same manner as outlined for the second range. That is, a sensing current that has a voltage of one-hundred millivolts or over will be sufficient to energize the relays 32 and 56.

When the switch 12 is depressed, the sensing current which will have a voltage that may again be a calibrated fraction of the input signal voltage will, during the time delay of the relay 22, travel from the point 15 through the sensing circuit including the contact 14, the contact 24 of the open relay 22, the contact 26 of the open relay 28, and the coil 30 to energize the coil 36 to close the contact 38 to cause energization of the relay 28. When the relay 28 is energized and locked in the circuit, by its locking contact 54, the sensing current will then continue in its circuit and will flow from the contact 24 of the open relay 22 through a contact 86 of the now closed relay 28, a contact 88 of the open relay 70 through a potentionmeter 60, and the coil 58 of the meter-relay 56 to energize a coil 62 of the meter-relay 56 to close a contact 64 to energize the relay 70. The relay 70 will then be actuated and be locked in the circuit by its locking contact 90.

After the time delay, the relay 22 will operate to send the full signal voltage through the meter circuit to the third range of the meter 40 by way of a multiplier 92. That is, the signal will flow through the contact 42 of the closed relay 22, the contact 66 of the closed relay 28, and a contact 94 of the closed relay 70, through the multiplier 92 and to the third range of the meter 40. The third range indicator 96 will then operate, being fed through its indicator circuit that includes the contact 50 of the closed relay 22, the contact 76 of the closed relay 28, and a contact 98 of the closed relay 70. Whenever any of the indicators 48, 74 or 96 operate, the indicator 46 will be extinguished; the indicator 46, as stated, will be operating only as long as the relay 22 is open and the switch 12 is depressed.

It will be understood that any number of circuits with their multipliers can be added to the system to produce any desired number of ranges. The signal will not be applied to the meter movement until the proper range is automatically selected. Once the sensing current or the signal is applied, the sensors are removed from the sensing circuit to prevent any measurement loading that might occur.

The incoming voltage is thus routed first in form of a full or fractioned voltage sensing current in one route for sensing, and for selecting of another route, in which to apply subsequently the full signal to the meter.

Any number of ranges may be incorporated, and the level of measurement can be as low as a few microvolts or microamperes, alternating current or direct current, and can be without limit on the high side. The meter read-out device can either be a high impedance vacuum tube voltmeter or a low impedance meter movement. The signal is not applied to the meter movement until the proper meter range is automatically selected as a function of the signal level. The automatically selected range may be indicated at 48, 74, 96 in the form of a range light or any other method of read-out or sound.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

Having thus described the invention, what we claim as new and desire to be secured by Letters Patent, is as follows:

1. In an automatic range selector, for use in measuring an electric signal, in combination, an electric meter circuit comprising a multi-range meter and a series of parallel circuit branches before said meter, one for each range, a sensing circuit including sensing means operable to determine the meter range of the value of said signal, selector means energizable by said sensing means and operable to switch said circuit branches to select the proper branch for the sensed signal value, and delayed action means operable to apply said signal to the selected circuit branch of said meter after a time interval sufficient to complete the sensing.

2. An automatic electric range selector and metering device, for use in connection with an incoming electric signal, comprising a time delay device operable after a time interval sufficient to route at least a portion of said signal in a first route and, after said time interval, operable to route said signal in a second route, a measuring means, and a selector means operable to detect the value of said signal in said first route and depending on the detected signal value selectively to direct said signal in said second route to said measuring means.

3. An automatic electric range selector and metering device, for use in connection with an electric signal, comprising a meter actuatable to measure said signal, a time delay device operable to receive said signal and to cascade it through one part of the circuit for a predetermined period of time, a detector relay operable to receive said signal and to guide said signal to pass through a second portion of said circuit when said signal exceeds a predetermined value, thereby to set a route to the meter, said time delay device operating after a predetermined period to send the signal through the set-up route to the meter.

4. In a device as claimed in claim 3, including a multiplier interposed in said circuit before said meter and operable to protect said meter from overloading.

5. In a device as claimed in claim 3, a fraction of the value of said signal being used to operate said detector relay and to sense said signal setting up the route to the meter whereby, after said time delay period has passed, the full signal value will selectively be directed through said route towards said meter.

6. An automatic electric range selector and metering device, for use in connection with an electric signal, comprising a meter actuatable to measure said signal, a time delay device operable to cascade at least a portion of the signal through one part of the circuit for a predetermined period of time, a detector relay operable to receive said signal portion and to guide said signal to pass through a second part of said circuit when said signal portion exceeds a predetermined value thereby to set a route to the metering device, a second detector relay operable to receive said signal portion from said second part of said circuit when said signal portion exceeds said predetermined value and to guide said signal portion to pass through a third part of said circuit when said signal portion exceeds a value in excess of the first predetermined value thereby to set said route to the metering device, said time delay device operating after a predetermined period to send the entire signal through the set-up route to the metering device.

References Cited in the file of this patent
UNITED STATES PATENTS

| | | |
|---|---|---|
| 2,606,943 | Barker | Aug. 12, 1952 |
| 2,643,344 | McLaren | June 23, 1953 |

FOREIGN PATENTS

| | | |
|---|---|---|
| 406,360 | Great Britain | Feb. 26, 1934 |
| 701,941 | Great Britain | Jan. 6, 1954 |